US010234661B2

(12) United States Patent
Lee

(10) Patent No.: US 10,234,661 B2
(45) Date of Patent: Mar. 19, 2019

(54) WIDE-ANGLE LENS

(71) Applicant: HON HAI PRECISION INDUSTRY CO., LTD., New Taipei (TW)

(72) Inventor: Ming-Lin Lee, New Taipei (TW)

(73) Assignee: HON HAI PRECISION INDUSTRY CO., LTD., New Taipei (TW)

(*) Notice: Subject to any disclaimer, the term of this patent is extended or adjusted under 35 U.S.C. 154(b) by 0 days.

(21) Appl. No.: 15/637,139

(22) Filed: Jun. 29, 2017

(65) Prior Publication Data

US 2018/0348491 A1    Dec. 6, 2018

Related U.S. Application Data

(60) Provisional application No. 62/513,972, filed on Jun. 1, 2017.

(51) Int. Cl.
| | |
|---|---|
| *G02B 9/64* | (2006.01) |
| *G02B 15/16* | (2006.01) |
| *G02B 7/04* | (2006.01) |
| *G02B 13/00* | (2006.01) |

(52) U.S. Cl.
CPC ............ *G02B 15/161* (2013.01); *G02B 7/04* (2013.01); *G02B 9/64* (2013.01); *G02B 13/0045* (2013.01)

(58) Field of Classification Search
CPC ... G02B 9/04; G02B 9/06; G02B 9/08; G02B 9/64; G02B 13/0045; G02B 13/005
USPC ........ 359/708, 717, 733, 736, 754, 793, 794
See application file for complete search history.

(56) References Cited

U.S. PATENT DOCUMENTS

| | | | |
|---|---|---|---|
| 2015/0168693 A1* | 6/2015 | Sun ........................ | G02B 13/04 |
| | | | 359/751 |
| 2017/0192200 A1* | 7/2017 | Hsieh ..................... | G02B 13/04 |
| 2017/0227745 A1* | 8/2017 | Noda ...................... | G02B 13/06 |

* cited by examiner

*Primary Examiner* — Darryl J Collins
(74) *Attorney, Agent, or Firm* — ScienBiziP, P.C.

(57) ABSTRACT

A wide-angle lens includes a first lens group, a second lens group, and an aperture arranged in that sequence from object side to image side. The first lens group as a whole has a positive refractive power, and includes a first lens, a second lens, a third lens, and a fourth lens. The first lens has a negative refractive power. The second lens has a negative refractive power. The third lens has a negative refractive power. The fourth lens has a positive refractive power. The second lens group as a whole has a positive refractive power, and includes a fifth lens, a sixth lens, a seventh lens, and an eighth lens. The fifth lens has a positive refractive power. The sixth lens has a negative refractive power. The seventh lens has a positive refractive power. The eighth lens has a positive refractive power.

14 Claims, 4 Drawing Sheets

WIDE-ANGLE LENS

FIELD

The subject matter herein generally relates to a lens, and more particularly, to a wide-angle lens.

BACKGROUND

A lens having light incident angle more than or equal to 180 degrees is a fisheye lens or a wide-angle lens. The wide-angle lens usually adopts full glass architecture, which may decrease the resolution and increase the cost of the wide-angle lens. Therefore, it is desirable to improve the resolution and reduce the cost of the wide-angle lens.

BRIEF DESCRIPTION OF THE DRAWINGS

Implementations of the present technology will now be described, by way of example only, with reference to the attached figures.

DETAILED DESCRIPTION

Figure 1:
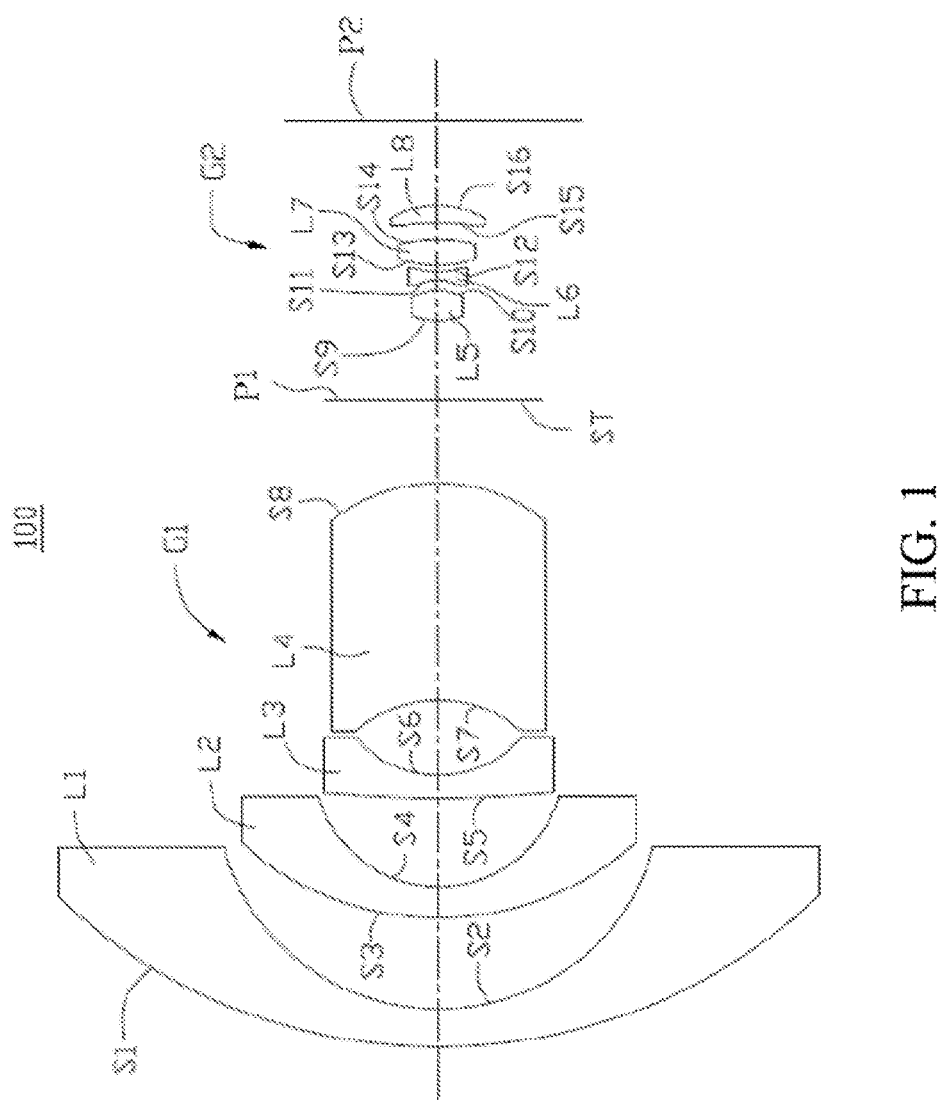
FIG. 1 is a diagram of an exemplary embodiment of a wide-angle lens.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to illustrate details and features of the present disclosure better. The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

The term "comprising" when utilized, means "including, but not necessarily limited to"; it specifically indicates open-ended inclusion or membership in the so-described combination, group, series, and the like.

FIG. 1 illustrates an exemplary embodiment of a wide-angle lens 100. The wide-angle lens 100 can be applied in a safety system or an electronic device (such as mobile phone, personal computer, game machine, and camera).

The wide-angle lens 100 comprises a first lens group G1, an aperture ST, and a second lens group G2. The first lens group G1, the aperture ST, and the second lens group G2 are arranged in that sequence from object side to image side.

The aperture ST is arranged between the first lens group G1 and the second lens group G2.

The first lens group G1 as a whole has a positive refractive power. The first lens group G1 comprises a first lens L1, a second lens L2, a third lens L3, and a fourth lens L4. The first lens L1, the second lens L2, the third lens L3, and the fourth lens L4 are arranged in that sequence from the object side to the image side.

The first lens L1 has a negative refractive power. In at least one exemplary embodiment, the first lens L1 is a convex-concave lens. That is, the first lens L1 comprises a convex surface S1 facing the object side and a concave surface S2 facing the image side. The first lens L1 can be made of glass.

The second lens L2 has a negative refractive power. In at least one exemplary embodiment, the second lens L2 is a convex-concave lens. That is, the second lens L2 comprises a convex surface S3 facing the object side and a concave surface S4 facing the image side. The second lens L2 can be made of glass.

The third lens L3 has a negative refractive power. In at least one exemplary embodiment, the third lens L3 is a convex-concave lens. That is, the third lens L3 comprises a convex surface S5 facing the object side and a concave surface S6 facing the image side. The third lens L3 can be made of glass.

The fourth lens L4 has a positive refractive power. In at least one exemplary embodiment, the fourth lens L4 is a concave-convex lens. That is, the fourth lens L4 comprises a concave surface S7 facing the object side and a convex surface S8 facing the image side. The concave surface S7 and the convex surface S8 are aspherical surfaces. The fourth lens L4 can be made of plastic.

The aperture ST comprises a flat surface P1.

The second lens group G2 as a whole has a positive refractive power. The second lens group G2 comprises a fifth lens L5, a sixth lens L6, a seventh lens L7, and an eighth lens L8. The fifth lens L5, the sixth lens L6, the seventh lens L7, and the eighth lens L8 are arranged in that sequence from the object side to the image side.

The fifth lens L5 has a positive refractive power. In at least one exemplary embodiment, the fifth lens L5 is a bi-convex lens. That is, the fifth lens L5 comprises a convex surface S9 facing the object side and another convex surface S10 facing the image side. The convex surfaces S9 and S10 are aspherical surfaces. The fifth lens L5 can be made of glass.

The sixth lens L6 has a negative refractive power. In at least one exemplary embodiment, the sixth lens L6 is a bi-concave lens. That is, the sixth lens L6 comprises a concave surface S11 facing the object side and another concave surface S12 facing the image side. The concave surfaces S11 and S12 are aspherical surfaces. The sixth lens L6 can be made of plastic.

The seventh lens L7 has a positive refractive power. In at least one exemplary embodiment, the seventh lens L7 is a bi-convex lens. That is, the seventh lens L7 comprises a convex surface S13 facing the object side and another convex surface S14 facing the image side. The convex surfaces S13 and S14 are aspherical surfaces. The seventh lens L7 can be made of plastic.

The eighth lens L8 has a positive refractive power. In at least one exemplary embodiment, the eighth lens L8 is a concave-convex lens. That is, the eighth lens L8 comprises a concave surface S15 facing the object side and a convex surface S16 facing the image side. The concave surface S15 and the convex surface S16 are aspherical surfaces. The eighth lens L8 can be made of plastic.

The wide-angle lens 100 satisfies the following conditions:

$$0 < (IHR-IHI)/IHI < 0.5;$$

$$-3.4 < SF1 < -1.4;$$

$$-3.04 < SF2 < -1.4;$$

$$Y8/T4 < 1.0;$$

$$C_{bst}14 < 0 \text{ and } C_{bst}24 < 0; \text{ and}$$

at least one surface of the second lens group G2 is an aspherical surface.

Of the conditions, IHR denotes a maximum image height, $IHI = \omega * f$, $\omega$ is incident angle (Semi-FOV), its unit is radian, and f is system focal length. If (IHR−IHI)/IHI is beyond an upper limit of the above conditions, an image center will be significantly compressed, and a quality of image center will be decreased. If (IHR−IHI)/IHI is beyond a lower limit of the above conditions, an image edge will be significantly compressed, and a quality of image edge will be decreased.

$SFi = (C1i + C2i)/(C1i − C2i)$, $i = 1, 2$, $C1i$ denotes a curvature of a surface facing the object side of an i th lens, $C2i$ denotes a curvature of a surface facing the image side of an i th lens, and SFi is a shape factor. If SFi is beyond an upper limit of the above conditions, distinguishability of image quality of large field will be decreased, and difficulties are encountered in placing a wide-angle field of view on the imaging plane. If SFi is beyond a lower limit of the above conditions, a manufacturability of lens will be decreased and a cost will be raised.

Y8 denotes an effective clear aperture diameter of the convex surface S8 of the fourth lens L4 in a maximum angle of incidence. T4 denotes a central thickness from the concave surface S7 to the convex surface S8 of the fourth lens L4, namely, a thickness of the fourth lens L4. If Y8/T4 is beyond the above conditions, manufacturability of lens will be decreased and a cost will be raised.

$C_{bst}14$ denotes a best fitting curvature of the concave surface S7 of the fourth lens L4, with a fitting range from 0 to a maximum effective radius. $C_{bst}24$ denotes a best fitting curvature of the convex surface S8 of the fourth lens L4, with a fitting range from 0 to a maximum effective radius.

The ranges of $C_{bst}14$ and $C_{bst}24$ in the above conditions can contribute to good system performance.

When at least one surface of the second lens group G2 (that is, at least one from the convex surface S9 to the convex surface S16) is an aspherical surface, an optical image quality of the wide-angle lens 100 is improved.

Since the wide-angle lens 100 satisfies the above conditions, the wide-angle lens 100 can maintain a good imaging quality even in case of a wide-angle field of view through a large aperture.

Data of the above conditions in one exemplary embodiment are shown in Table 1.

Figure 2:
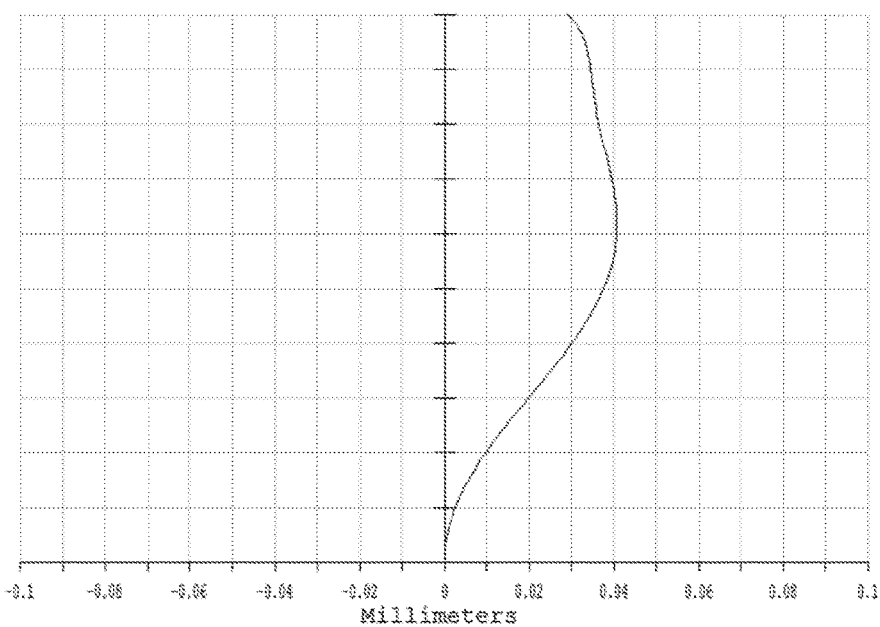
FIG. 2 depicts a longitudinal aberration diagram of the wide-angle lens of FIG. 1, in a wavelength of 587 nm.

In at least one exemplary embodiment, a longitudinal aberration diagram of an exemplary embodiment of the wide-angle lens 100 in a wavelength of 587 nm is shown in FIG. 2, and a vertical axis is a relative field numeric.

Figure 3:
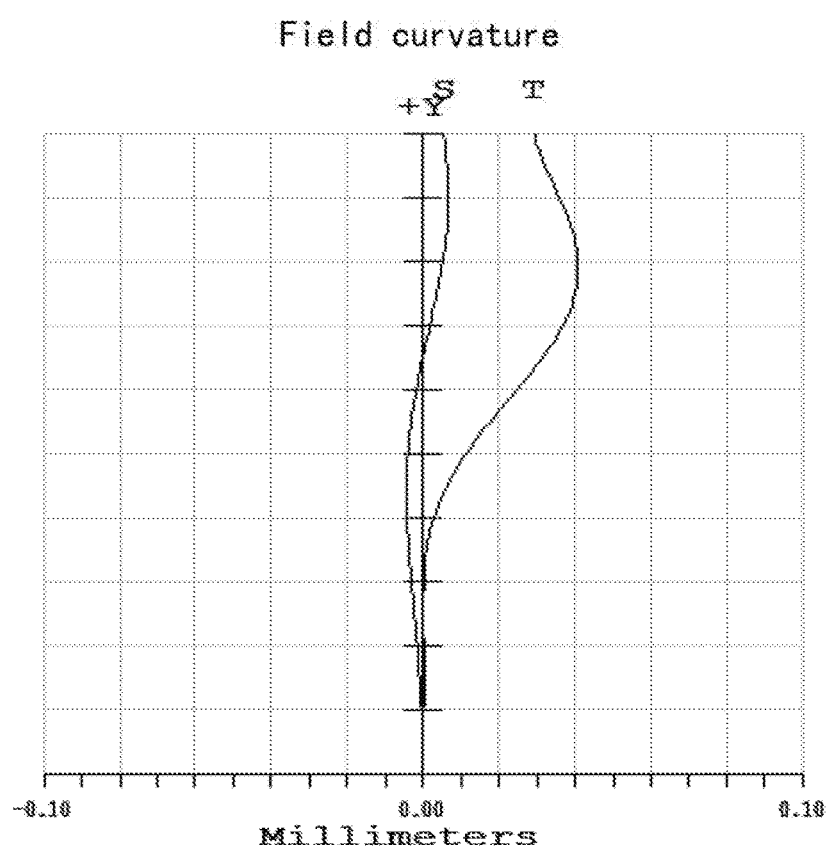
FIG. 3 is a field curvature diagram of the wide-angle lens of FIG. 1, in a wavelength of 587 nm.

In at least one exemplary embodiment, a field curvature diagram of an exemplary embodiment of the wide-angle lens 100 in a wavelength of 587 nm is shown in FIG. 3, and a vertical axis is a relative field numeric.

Figure 4:
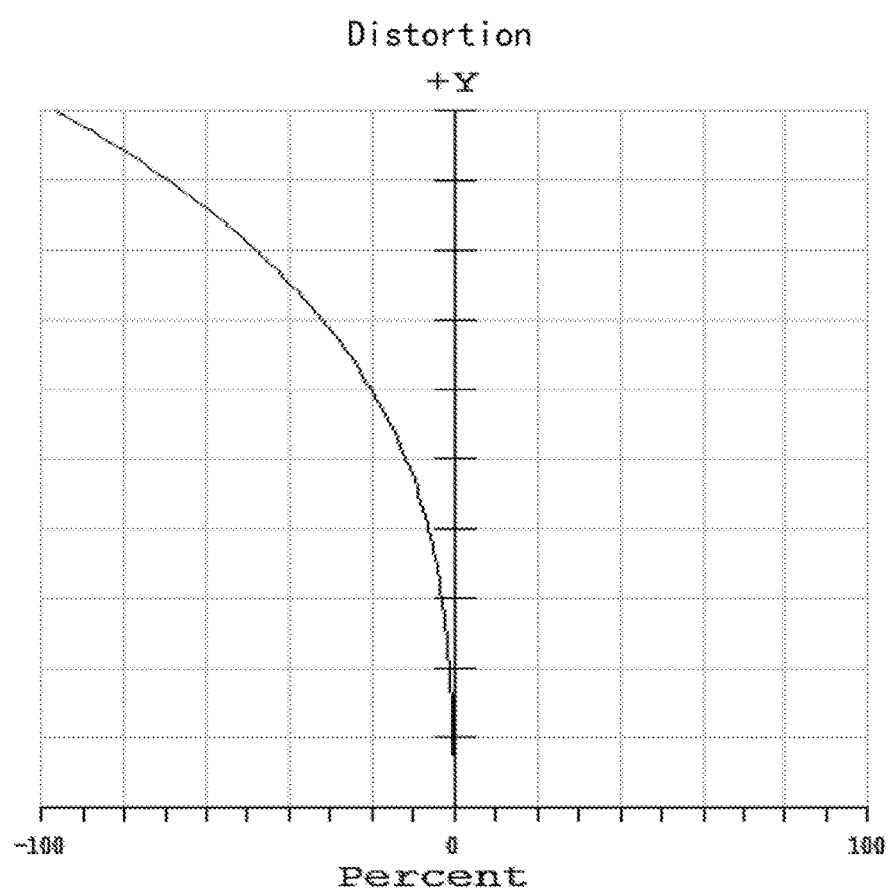
FIG. 4 is a distortion diagram (f*tan θ) of the wide-angle lens of FIG. 1, in a wavelength of 587 nm.

In at least one exemplary embodiment, a distortion diagram of an exemplary embodiment of the wide-angle lens 100 in a wavelength of 587 nm is shown in FIG. 4, and a vertical axis is a relative field numeric.

In at least one exemplary embodiment, a radius of curvature "R" of each surface, a distance "d" in an optical axis between two adjacent surfaces, a refractive index "Nd" of each lens, and an abbe number "Vd" of each lens are shown in Table 1.

TABLE 2

| surface | R (mm) | d (mm) | Nd | Vd | remark |
|---|---|---|---|---|---|
| S1 | 30.73 | 2.500 | 1.806 | 41.00 | L1 |
| S2 | 12.87858 | 5.383 | | | |
| S3 | 16.98542 | 1.734 | 1.804 | 46.6 | L2 |
| S4 | 7.13069 | 5.372 | | | |
| S5 | 88.50505 | 1.251 | 1.64 | 60.2 | L3 |
| S6 | 6.560419 | 4.146 | | | |
| S7 | −6.76256 | 15.174 | 1.544 | 56.00 | L4 |
| S8 | −6.08369 | 10.299 | | | |
| P1 | Infinity | 0.261 | | | aperture (ST) |
| S9 | 4.510926 | 1.767 | 1.589 | 61.3 | L5 |
| S10 | −4.13438 | 0.772 | | | |
| S11 | −2.80403 | 0.396 | 1.642 | 22.5 | L6 |
| S12 | 4.123589 | 0.254 | | | |
| S13 | 6.31451 | 1.634 | 1.544 | 56.00 | L7 |
| S14 | −3.98513 | 0.815 | | | |
| S15 | −51.5461 | 1.232 | 1.544 | 56.00 | L8 |
| S16 | −3.4705 | 0.94 | | | |
| P2 | Infinity | — | | | imaging plane |

Formula definition of aspherical surfaces is:

$$Z(y) = \frac{h^2/R}{1 + \sqrt{1 - (1+K)(h/R)^2}} + Ah^4 + Bh^6 + Ch^8 + Dh^{10} + Eh^{12} + Fh^{14} + Gh^{16}$$

Of the formula, Z denotes an aspherical surface sag of each surface; R denotes a radius of curvature; h denotes a radial distance of the surface from the optical axis; K denotes a conic constant; and A, B, C, D, E, F, and G denote aspherical coefficients of each surface.

In at least one exemplary embodiment, the aspherical coefficients A, B, C, D, E, F, and G are shown in Table 3 and Table 4.

TABLE 1

| (IHR-IHI)/IHI | SF1 | SF2 | Y8 | T4 | Y8/T4 | $C_{bst}14$ | $C_{bst}24$ | aspherical surface |
|---|---|---|---|---|---|---|---|---|
| 0.333 | −2.44 | −2.44 | 13.26 | 15.17 | 0.874 | −0.115 | −0.12 | S7, S8, S9, S10, S11, S12, S13, S14, S15, S16 |

TABLE 3

| aspherical coefficient | S7 | S8 | S9 | S10 | S11 | S12 |
|---|---|---|---|---|---|---|
| K | −10.6809 | −1.1141 | 0.6259 | −5.7268 | 1.1729 | −9.9270 |
| A | −1.2499E−03 | 4.3187E−04 | −2.7879E−03 | −6.4085E−03 | −1.3730E−02 | −1.7317E−03 |
| B | 5.4520E−05 | −1.7301E−05 | 1.3347E−03 | −8.3078E−03 | −3.8986E−03 | 2.5008E−03 |
| C | −2.5913E−06 | 4.7686E−07 | −1.6161E−03 | 3.6193E−04 | −6.9724E−04 | 7.5702E−05 |
| D | −5.8605E−10 | −8.6265E−09 | −4.8362E−04 | 1.1723E−04 | −2.4727E−04 | −8.4228E−05 |
| E | 3.3617E−09 | 8.5687E−11 | 9.8651E−05 | −5.5647E−05 | 1.1841E−04 | −4.0086E−05 |
| F | −7.9402E−11 | −3.5028E−13 | 8.8125E−05 | −2.3557E−05 | −3.3259E−06 | −6.1760E−06 |
| G | 2.3266E−13 | −2.8881E−17 | −2.9934E−05 | 1.0376E−05 | −2.4952E−05 | 1.5814E−06 |

TABLE 4

| aspherical coefficient | S13 | S14 | S15 | S16 |
|---|---|---|---|---|
| K | 3.6819 | −3.4326 | 0 | −20.2715 |
| A | 1.0219E−02 | 1.1117E−02 | −4.2058E−03 | −1.3492E−02 |
| B | −1.5569E−03 | 1.6110E−03 | 5.4013E−04 | −1.0225E−03 |
| C | −2.2327E−04 | −4.6525E−04 | 1.1981E−04 | 1.7097E−04 |
| D | 4.3297E−07 | −1.2371E−05 | −4.4502E−06 | 1.7971E−05 |
| E | 7.4020E−06 | 3.4324E−06 | −1.2977E−07 | 7.9284E−07 |
| F | 9.3499E−07 | 5.8370E−07 | 7.2771E−09 | −9.4129E−08 |
| G | −3.8732E−07 | −2.3495E−08 | −7.9227E−09 | −2.5590E−08 |

In at least one exemplary embodiment, an effective focal length "EFL", an F-number "F/NO", and a field of view angle "FOV(2□)" of the wide-angle lens 100 in one exemplary embodiment are shown in Table 5.

TABLE 5

| EFL | F/NO | FOV(2□) |
|---|---|---|
| 0.928 | 2.4 | 210 |

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A wide-angle lens comprising:
a first lens group;
a second lens group; and
an aperture arranged between the first lens group and the second lens group, the first lens group, the aperture, and the second lens group arranged in that sequence from object side to image side;
wherein the first lens group as a whole has a positive refractive power, and comprises a first lens, a second lens, a third lens, and a fourth lens arranged in that sequence from the object side to the image side, the first lens has a negative refractive power, the second lens has a negative refractive power, the third lens has a negative refractive power, and the fourth lens has a positive refractive power, the fourth lens is a concave-convex lens, and comprises a concave surface facing the object side and a convex surface facing the image side;
wherein the second lens group as a whole has a positive refractive power, and comprises a fifth lens, a sixth lens, a seventh lens, and an eighth lens arranged in that sequence from the object side to the image side, the fifth lens has a positive refractive power, the sixth lens has a negative refractive power, the seventh lens has a positive refractive power, and the eighth lens has a positive refractive power.

2. The wide-angle lens of claim 1, wherein the first lens is a convex-concave lens, and comprises a convex surface facing the object side and a concave surface facing the image side.

3. The wide-angle lens of claim 1, wherein the second lens is a convex-concave lens, and comprises a convex surface facing the object side and a concave surface facing the image side.

4. The wide-angle lens of claim 1, wherein the third lens is a convex-concave lens, and comprises a convex surface facing the object side and a concave surface facing the image side.

5. The wide-angle lens of claim 1, wherein the fifth lens is a bi-convex lens, and comprises a convex surface facing the object side and another convex surface facing the image side.

6. The wide-angle lens of claim 1, wherein the sixth lens is a bi-concave lens, and comprises a concave surface facing the object side and another concave surface facing the image side.

7. The wide-angle lens of claim 1, wherein the seventh lens is a bi-convex lens, and comprises a convex surface facing the object side and another convex surface facing the image side.

8. The wide-angle lens of claim 1, wherein the eighth lens is a concave-convex lens, and comprises a concave surface facing the object side and a convex surface facing the image side.

9. The wide-angle lens of claim 1, wherein the first lens, the second lens, the third lens, and the fifth lens are made of glass, and the fourth lens, the sixth lens, the seventh lens, and the eighth lens are made of plastic.

10. The wide-angle lens of claim 1, further satisfying condition of $0<(IHR-IHI)/IHI<0.5$, wherein IHR denotes a maximum image height, $IHI=\omega*f$, $\omega$ is incident angle (Semi-FOV), its unit is radian, and f is system focal length.

11. The wide-angle lens of claim 1, further satisfying conditions of $-3.4<SF1<-1.4$ and $-3.4<SF2<-1.4$, wherein $SFi=(C1i+C2i)/(C1i-C2i)$, i=1, 2, $C1i$ denotes a curvature of a surface facing the object side of an i th lens, $C2i$ denotes a curvature of a surface facing the image side of an i th lens, and SFi is a shape factor.

12. The wide-angle lens of claim 1, further satisfying conditions of $Y8/T4<1.0$, wherein Y8 denotes an effective clear aperture diameter of the convex surface of the fourth lens facing the image side in a maximum angle of incidence, T4 denotes a thickness of the fourth lens.

13. The wide-angle lens of claim 1, further satisfying conditions of $C_{bst}14<0$ and $C_{bst}24<0$, wherein $C_{bst}14$ denotes a best fitting curvature of the concave surface of the fourth lens facing the object side, $C_{bst}24$ denotes a best fitting curvature of the convex surface of the fourth lens facing the image side.

14. The wide-angle lens of claim 1, wherein at least one surface of the second lens group is an aspherical surface.

* * * * *